United States Patent [19]

Itoh

[11] Patent Number: 4,494,191
[45] Date of Patent: Jan. 15, 1985

[54] SIMULATION UNIT SHARING THE SAME CPU AS A PROGRAMMING CONTROL UNIT

[75] Inventor: Yoshifumi Itoh, Aichi, Japan

[73] Assignee: Mitsubishi Denki Kabushiki Kaisha, Tokyo, Japan

[21] Appl. No.: 390,880

[22] Filed: Jun. 22, 1982

[30] Foreign Application Priority Data

Jun. 25, 1981 [JP] Japan .................. 56-98748

[51] Int. Cl.³ .................................. G06F 9/00
[52] U.S. Cl. .................................... 364/200
[58] Field of Search ........ 364/140, 141, 200 MS File, 364/900 MS File

[56] References Cited

U.S. PATENT DOCUMENTS 4,070,705  1/1978  Lockwood et al. ............... 364/200
4,306,286  12/1981  Cocke et al. ....................... 364/200

*Primary Examiner*—Raulfe B. Zache

*Attorney, Agent, or Firm*—Bernard, Rothwell & Brown

[57] ABSTRACT

A programming system fitted with CRT comprising a programming control unit fitted with CRT and simulation unit for a programmable controller in which the programming control unit fitted with CRT consists of a central processing unit (CPU), a control programming ROM and a controlling RAM being connected to the CPU and a keyboard connected with the CPU through a CRT controller and keyboard controller, and further involves an interfacial part for connecting the programming control unit with the simulation unit, while the simulation unit for programmable controller consists of a control programming ROM for the programmable controller, a control RAM, and respective memories corresponding to a process input image memory and a process output image memory, and further possesses interfacial functions being connectable to the programming control unit fitted with CRT.

2 Claims, 4 Drawing Figures

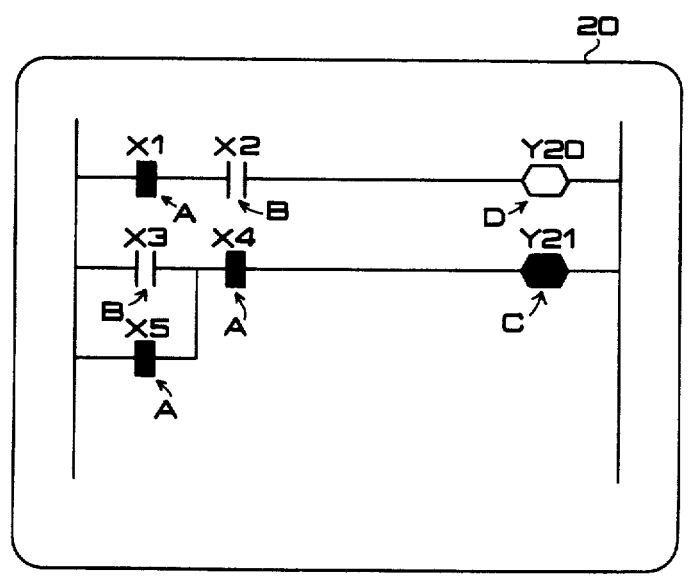
F I G. 3

SIMULATION UNIT SHARING THE SAME CPU AS A PROGRAMMING CONTROL UNIT

BACKGROUND OF THE INVENTION

1. Field of the Invention

The present invention relates to a programming system fitted with CRT, and more particularly to a system which is utilized for effecting programming of a programmable controller.

2. Description of the Prior Art

Heretofore, an usual programmable controller 28 has had such a construction as illustrated in FIG. 1. Namely, the programmable controller (PC) 28 comprises a central processing unit (CPU) 30, a sequence programming memory 34, a PC control programming ROM 36, a controlling RAM 38, a process input image memory 40, a process output image memory 42, a PSE interfacial part 32 for connecting the programmable controller to a programming system fitted with CRT (PSE) 10, and the like. A sequential program for the aforesaid PC 28 has previously been prepared by means of the PSE 10. Further a construction of the PSE 10 is also illustrated in FIG. 1. Namely, the PSE 10 comprises a CPU 12, a control programming ROM 14, a controlling RAM 16, a CRT controller 18, a CRT 20, a keyboard controller 22, a keyboard 24, a PC interfacial part 26, and the like. And the aforesaid PC 28 is suitably connected with the aforesaid PSE 10 by means of a connecting cable 44 at the time of loading a program upon the PC 28, monitoring the operational condition of the PC 28, effecting the simulation, and the like occasions.

Operation of the PC 28 will be described in detail hereinbelow.

Namely, the PC 28 is generally connected to an objective unit to be controlled and is operated by means of input and output 46 and 48 while transmitting signal (In this case, the connecting cable 44 shown in FIG. 1 has not been connected) so that the PC 28 itself comes to be installed in the locale.

The PC 28 is operated in accordance with the sequential program prepared by a user, and such program has been inputted in the memory 34. In the circumstances, the PC 28 effects the operation at the CPU 30 in accordance with the input 46 on the basis of the program inputted in the memory 34 while being controlled by means of the ROM 36, and controls the object to be controlled in accordance with the output 48. As a result, the RAM 38 acts as a temporary memory device for registration and the like of the CPU 30.

Next, operation of the PSE 10 will be described in detail hereinbelow.

The PSE 10 possesses such functions that prepares a program to be inputted in the memory 34 in the PC 28 and loads the program through the connecting cable 44, that monitors the operational condition of the PC 28, that effects simulation of the PC 28, and the like functions. In this connection, the connecting cable 44 is connected to the PC 28 in the case where it is intended to operate such functions as mentioned above.

Further the PSE 10 obtains input from the keyboard 24 and carries out the operation in the CPU 12 while being controlled by means of the ROM 14 so that the PSE 10 displays the state on that occasion in the CRT 20. The RAM 16 operates for registration and the like similarly to the RAM 38.

In addition, in the programming system illustrated in FIG. 1, the PSE 10 which does not involve a memory for sequential program is shown, but such a system involving a memory corresponding to the memory 34 in the PC 28 is also available on the market.

Meanwhile, operational simulation of the aforesaid PC 28 must be carried out in order to debug such sequential program by the use of the aforesaid PSE 10. In such a case, a conventional system has been operated in such a way, as illustrated in FIG. 1, that an actual process input 46 and a process output 48 of the PC 28 are not inputted and outputted into the system, but the contents of the process input image memory 40 and the controlling RAM 38 in the PC 28 are rewritten by means of the keyboard 24 in the PSE 10. According to such arrangements, the conventional system displays the operational status on the picture of the CRT 20 in the PSE, thereby to confirm, such operation.

In the conventional system as described above, however, the PSE 10 must have actually been connected to the PC 28 main body in order to carry out operational simulation of the aforesaid PC 28 by means of the PSE 10. For this reason, it has been difficult to effect debugging of such sequential program on the top of a desk or the like. On the other hand, the greatest possible care is required for such debugging work of program so that if such working cannot be practised on the top of a desk or the like, it is very inconvenient in view of such debugging work.

SUMMARY OF THE INVENTION

It is an object of the present invention to provide a programming system fitted with CRT by which simulation of a programmable controller can easily be carried out on the top of a desk or the like, whereby debugging work for troublesome sequential program can efficiently and simply be effected.

In accordance with one aspect of the present invention, there is proposed a programming system fitted with CRT comprising a programming control unit fitted with CRT being composed of a central processing unit (CPU), a control programming ROM and a controlling RAM being connected to the aforesaid central processing unit, respectively, a CRT and a keyboard connected with the aforesaid central processing unit through a CRT controller and a keyboard controller, respectively, and involving an interfacial part for connecting the aforesaid programming control unit with a simulation unit, connectors of the aforesaid CPU, and a sequence programming memory; and a simulation unit for a programmable controller being composed of a control programming ROM for the aforesaid programmable controller, a control RAM, and respective memories corresponding to a process input image memory and a process output image memory, and possessing interfacial functions being connectable to the aforesaid programming control unit fitted with CRT.

BRIEF DESCRIPTION OF THE DRAWINGS

FIG. 3 is a view illustrating an example of display condition of picture in the monitor CRT of FIG. 2.

DESCRIPTION OF A PREFERRED EMBODIMENT

Figure 1:
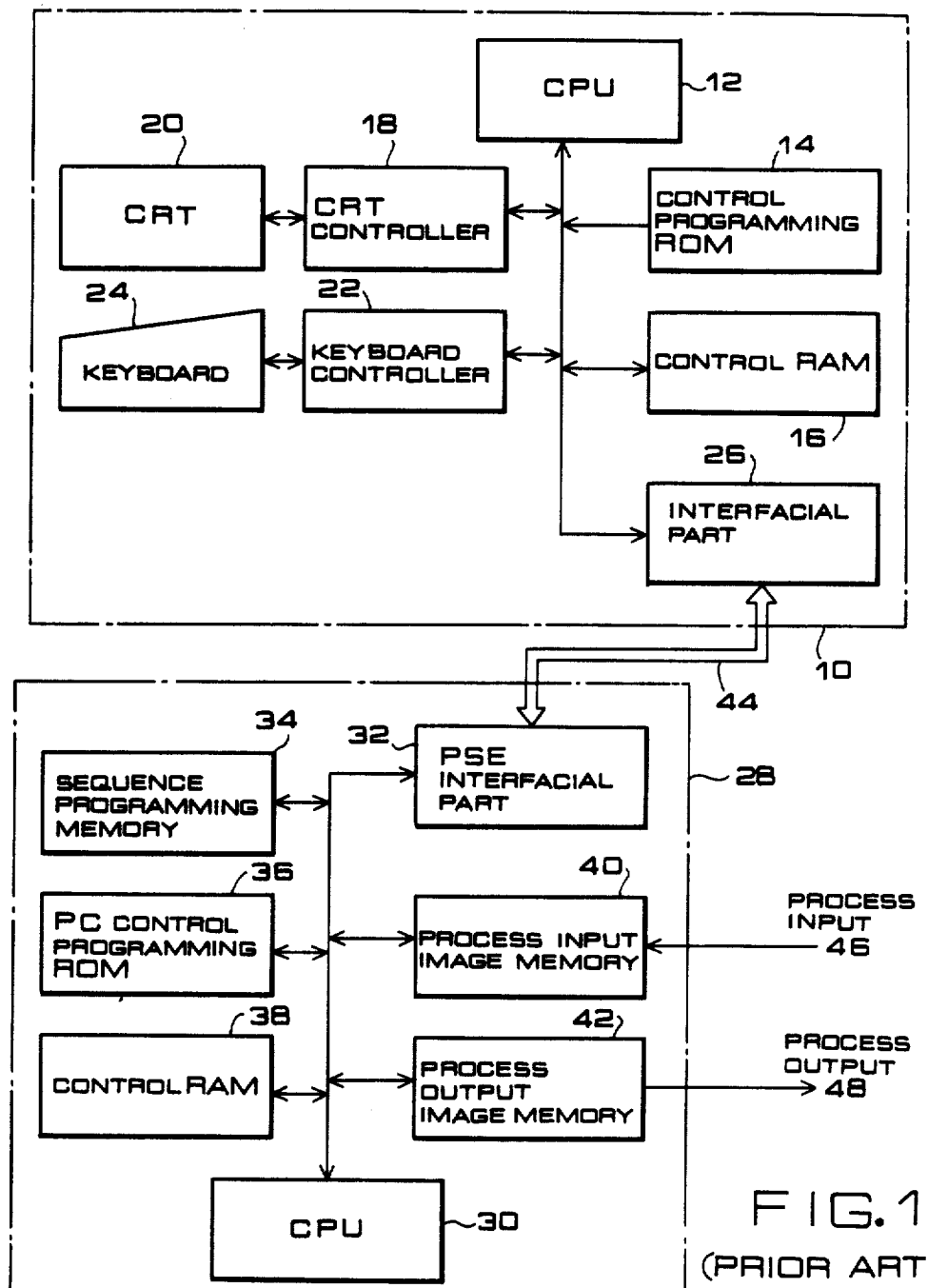
FIG. 1 is a block diagram illustrating an embodiment of a conventional programming system fitted with CRT.
Figure 2:
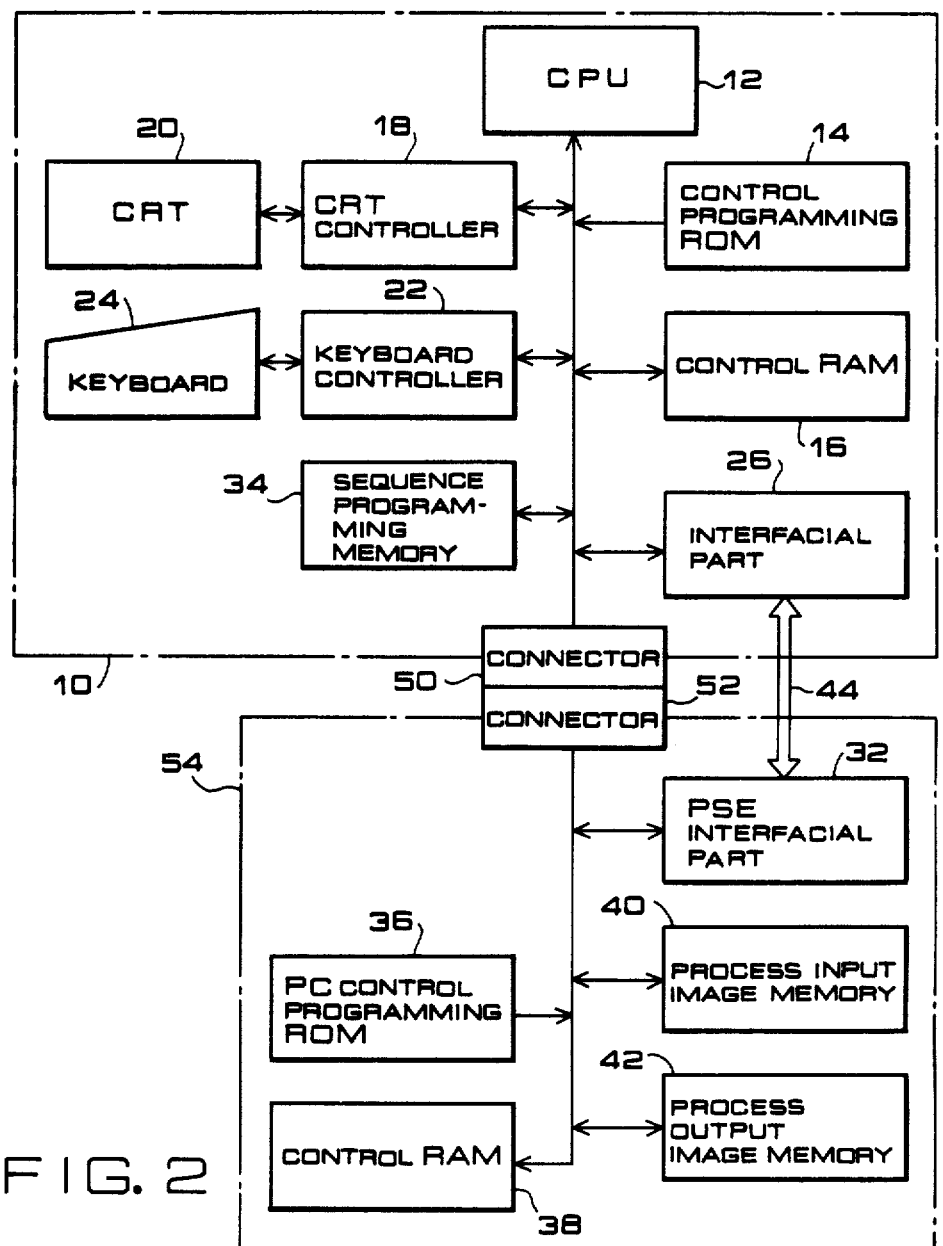
FIG. 2 is a block diagram illustrating an embodiment of the programming system fitted with CRT according to the present invention.

FIG. 2 is a block diagram illustrating an embodiment of the PSE according to the present invention in which the PSE 10 comprises a CPU 12, a control programming ROM 14, a control RAM 16, a CRT controller 18, a CRT 20, a keyboard controller 22, a keyboard 24, a PC interfacial part 26, and a sequence programming memory 34. The PSE 10 is insertably provided with a simulation unit 54 possessing simulating functions in respect of the aforesaid PC 28 through connecting connectors 50 and 52. The simulation unit 54 is provided with memories corresponding to each memory of an interfacial part 32 and the aforesaid PC 28 (FIG. 1). Namely, the simulation unit 54 involves a PC control programming ROM 36, a control RAM 38, a process input image memory 40, and a process output memory 42. Furthermore the simulation unit 54 is arranged in such a way that it can be connected with the aforesaid PSE 10 by means of the connecting connectors 50, 52 and a connecting cable 44.

Moreover the sequence programming memory 34 of the aforesaid PSE 10 is arranged in such a manner that a program can be stored in the PSE 10 without accompanying the simulation unit 54 and the PC 28 (FIG. 1).

In addition, the aforesaid simulation unit 54 requires another CPU for the operation thereof, but in FIG. 2, the CPU 12 in the PSE 10 is connected to the simulation unit 54 through the connectors 50 and 52 for common use.

Figure 4:
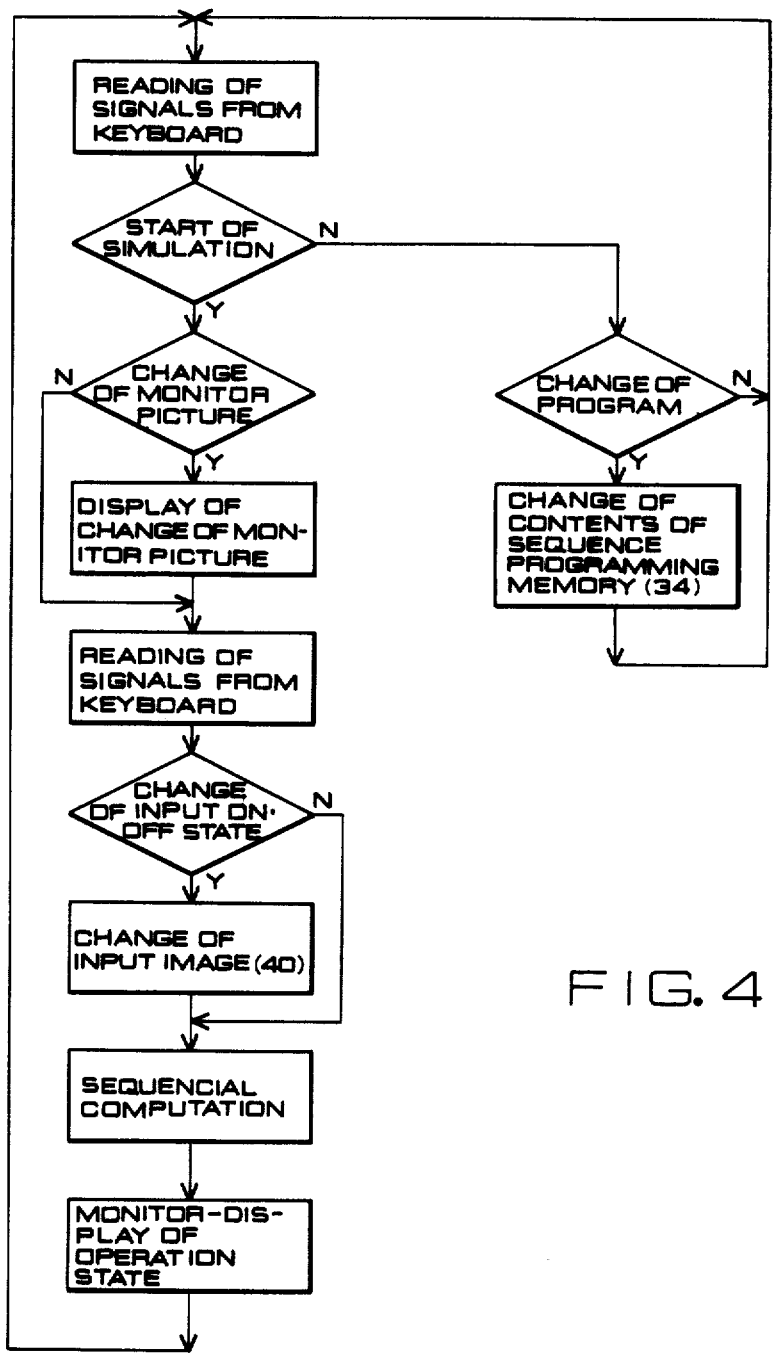
FIG. 4 is a flow chart showing simulating operation by CPU in the programming system of FIG. 2.

Simulating operation of the embodiment illustrated in FIG. 2 will be described hereinbelow with reference to FIGS. 3 and 4. A sequential program prepared by a user is simulated to effect debugging. At this time, the sequential program stored in the memory 34 is debugged (The sequential program stored in the memory 34 of the PC 28 in FIG. 1 is inputted in the former memory 34). For this reason, operation is effected in the CPU in accordance with input (instead of the input 46 in FIG. 1) from the keyboard 24 on the basis of the program in the memory 34 while being controlled by means of the ROM 36, thereby to display output in the CRT 20 so that simulation is carried out. In this case, the input from the keyboard 24 is imaged in the memory 40, whilst the displayed output upon the CRT 20 is imaged in the memory 42. Furthermore the connecting connectors 50 and 52 are connected for input and output in order to unify the CPU 12. It is to be noted that since the PC 28 is required to operate independently and exhibits rapid operation, the same itself possesses the CPU 30. On the other hand, the simulation unit 54 is utilized in only the case where simulation is carried out and in such case, the operation may be carried out at a low speed, thus the CPU 12 can be placed for common use. Moreover the other portion stated above shown in FIG. 2 operates similarly to the description relating to that of FIG. 1.

As mentioned above, the simulation unit 54 is employed in only the case where the simulation of sequential program is effected so that the simulation unit 54 has substantially equivalent construction and functions to those of the PC 28. However, the program which is simulated comes to be inputted into the memory 34 of the PSE (10).

FIG. 3 is a view showing a display condition of monitor CRT picture in which $X_1$–$X_5$ indicate process input numbers, and $Y_{20}$ and $Y_{21}$ indicate process output numbers respectively. In addition, in FIG. 3, reference character A designates contacts in active state, B contacts in inactive state, C a coil in driven state, and D a coil in undriven state, respectively. Such display manner of these operational conditions relates merely to an example, and, for instance, a manner in which display is effected by alternately repeating light and darkness may also be adopted.

In the above stated embodiment, functions of the aforesaid simulation unit 54 are separately provided from those of the PSE 10, but it is also possible to include such functions in those of the aforesaid PSE 10.

As described above, in accordance with the programming system fitted with CRT of the present invention, even if this system has not actually been connected with a programmable controller, operational simulation can readily be carried out on the top of a desk or the like, when the aforesaid simulation unit is utilized. As the result, debugging work for sequential program can easily and efficiently be effected in accordance with the manner as mentioned above.

What is claimed is:

1. A programming system fitted with CRT comprising:
    a programming control unit fitted with CRT being composed of a central processing unit (CPU), a control programming ROM and a controlling RAM being connected to said central processig unit, a CRT and a keyboard connected with said central processing unit through a CRT controller and a keyboard controller, respectively, and an interfacial part for connecting said programming control unit with a simulation unit, a connector for the connection of said CPU to said simulation unit, and a sequence programming memory; and
    said simulation unit being composed of a control programming ROM for said programmable controller, a control RAM, and respective memories corresponding to a process input image memory, said simulation unit including an interfacial part and means for connecting said interfacial part to said interfacial part of said programming control unit, and a connector, and means for connecting said connector to said connector of said programming control unit.

2. A programming system fitted with CRT as claimed in claim 1 wherein said central processing unit for said programming control unit fitted with CRT serves also as the central processing unit for said simulation unit.

* * * * *

UNITED STATES PATENT AND TRADEMARK OFFICE
CERTIFICATE OF CORRECTION

PATENT NO. : 4,494,191
DATED : January 15, 1985
INVENTOR(S) : Yoshifumi Itoh

It is certified that error appears in the above-identified patent and that said Letters Patent is hereby corrected as shown below:

Column 4, line 38, "processig" should be --processing--.

Column 4, line 49, after the word "memory" and before the "," insert --and a process output image memory--.

Signed and Sealed this

Ninth Day of July 1985

[SEAL]

Attest:

DONALD J. QUIGG

*Attesting Officer*     Acting Commissioner of Patents and Trademarks